A. B. MUCKLEROY.
GARDEN HOE CULTIVATOR.
APPLICATION FILED APR. 14, 1917.
1,234,485.
Patented July 24, 1917.
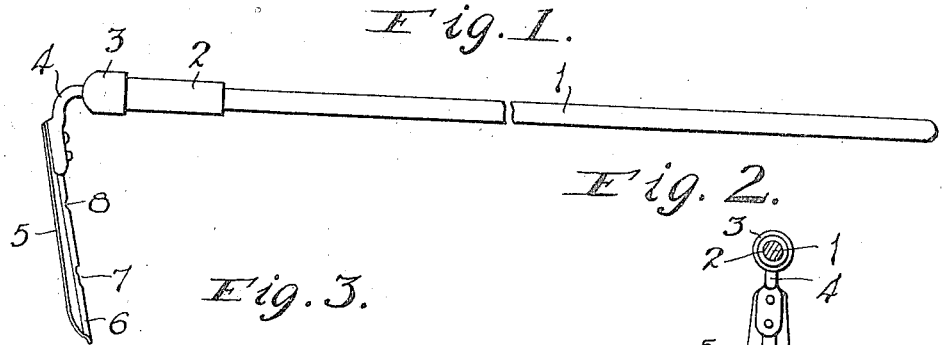
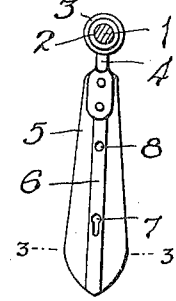
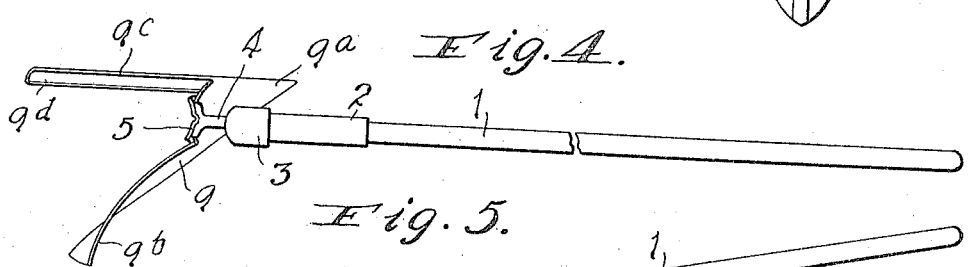
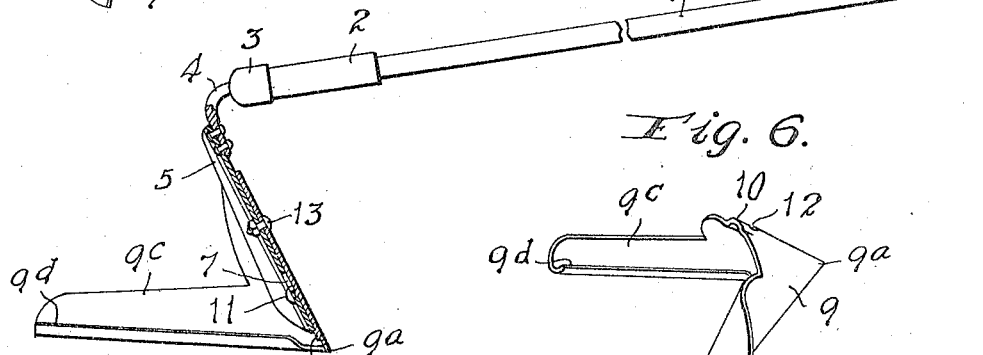
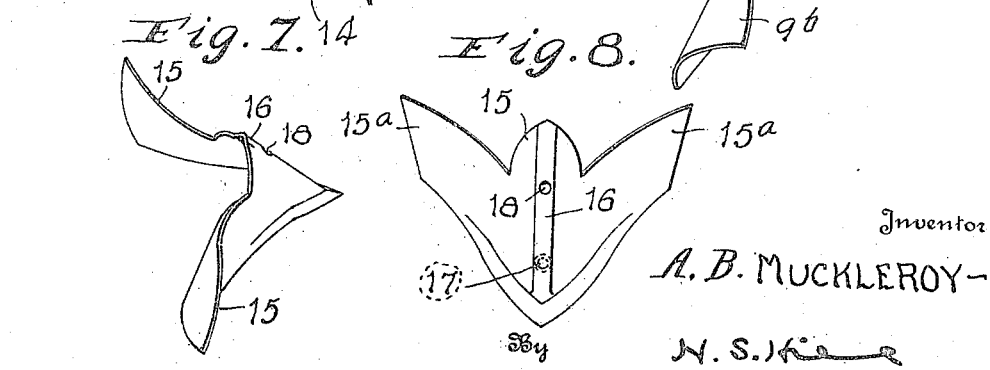
Inventor
A. B. MUCKLEROY
By
N. S. K——
Attorney

UNITED STATES PATENT OFFICE.

ALLIE B. MUCKLEROY, OF NACOGDOCHES, TEXAS.

GARDEN-HOE CULTIVATOR.

1,234,485.   Specification of Letters Patent.   Patented July 24, 1917.

Application filed April 14, 1917. Serial No. 162,129.

*To all whom it may concern:*

Be it known that I, ALLIE B. MUCKLEROY, a citizen of the United States, residing at Nacogdoches, in the county of Nacogdoches, State of Texas, have invented a new and useful Garden-Hoe Cultivator; and I do hereby declare the following to be a full, clear, and exact description of the invention, such as will enable others skilled in the art to which it appertains to make and use the same.

The present invention relates to a combination garden hoe and cultivating implement, the object of the invention being to provide a device of this character which has a number of interchangeable working elements and embodies novel features of construction whereby it can be quickly adjusted for use as a drill opener, solid sweep, hoe, or turning plow.

Further objects of the invention are to provide an implement of this character which is comparatively simple and inexpensive in its construction, which can be manually manipulated without undue physical exertion, and which will enable a garden to be plowed and worked in a most effective manner.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a side elevation of a drill opening implement constructed in accordance with the invention, a portion of the handle being broken away.

Fig. 2 is a front elevation of the same with the handle appearing in section.

Fig. 3 is a transverse sectional view through the drill opener on the line 3—3 of Fig. 2.

Fig. 4 is a top plan view of the device with the turning plow attachment applied thereto, a portion of the handle being broken away.

Fig. 5 is a side elevation of the arrangement shown by Fig. 4, portions being broken away and shown in section to illustrate more clearly the details of construction.

Fig. 6 is a detail perspective view of the turning plow attachment.

Fig. 7 is a similar view of the sweep.

Fig. 8 is a front elevation of the sweep.

Corresponding and like parts are referred to in the following description and indicated in all the views of the drawings by the same reference characters.

Referring to the drawings, which illustrate one embodiment of the invention, the numeral 1 designates a handle which is similar to the handle of an ordinary hoe, being shown as reinforced at one end thereof by a sleeve 2 and cuff 3. A stem 4 is fitted in the reinforced end of the handle and projects therefrom, the said projecting end of the stem being curved and rigidly secured to a sheet metal drill opener foot 5. This drill opener has a long and narrow formation and is pointed at its lower end, being transversely concave and provided at its middle point with a longitudinally extending forwardly pressed reinforcing rib 6. This reinforces and strengthens the drill opener, and also facilitates the accurate positioning and firm fastening of other working elements to the drill opener. A key-hole slot 7 and an opening 8 are provided in the drill opener 5, being preferably positioned in such a manner as to extend through the rib 6.

A turning plow attachment 9 is designed to be detachably fitted upon the drill opener 5, and when the implement is used with this attachment fitted thereon, the soil will be turned over and small furrows opened up in much the same manner as would be done by a regular plow. This plow attachment 9 is formed from a single piece of sheet metal and includes a plow point 9ª, a mold board 9ᵇ, and a land side 9ᶜ, the mold board being deflected outwardly so as to turn the soil in the usual manner, while the lower horizontal edge of the land side is rolled inwardly at 9ᵈ to reinforce the same and ride over the soil, thereby assisting in guiding or directing the movements of the plow. An outwardly pressed rib 10 is provided at the intersection of the mold board 9ᵇ and land side 9ᶜ, said rib corresponding to and receiving the reinforcing rib 6 of the drill opener 5 when the turning plow attachment is applied to the drill opener. A headed stud 11 projects rearwardly from the turning plow 9, being arranged to interlock with the key-hole slot 7 of the drill opener 5, and an opening 12 is also provided in the turning plow, said opening registering with the opening 8 of the drill opener 5 when the turning plow is in operative position. A locking bolt 13 may then be inserted through the registering openings 8 and 12. If desired, the inner face of the turning plow 9 may also be provided with a shoulder 14, said shoulder being so arranged that the lower end of the drill opener 5 will spring into engagement therewith when the stem of the headed stud 11 reaches the contracted end of the key-hole slot 7, thereby locking the parts in operative position.

A sweep attachment 15 may be used interchangeably with the turning plow attachment 9, said sweep attachment being adapted to be used for wiping out the middles, or as a hoe. This sweep is also formed of a single piece of sheet material, and includes rearwardly diverging side wings 15ª. The middle of the sweep has a reinforcing rib 16 pressed outwardly therefrom, said rib being adapted to fit over and receive the rib 6 of the drill opener 5 when the sweep attachment is applied to the drill opener. A headed stud 17 projects rearwardly from the sweep for engagement with the key-hole slot 8, and an opening 18 in the sweep is adapted to register with the opening 8 of the drill opener for the reception of the locking bolt 13 when the sweep attachment is in operative position. The sweep attachment may be made in any desired size, either large or small, and the configuration thereof may vary, as desired.

Having thus described the invention, what I claim as new and desire to secure by Letters Patent, is:—

1. A device of the character described including a handle, a drill opener carried by one end of the handle and having a longitudinally extending rib pressed therefrom, said drill opener being provided with a key-hole slot, a working tool detachably applied to the drill opener and having a longitudinal rib pressed therefrom which engages the longitudinal rib of the drill opener, a headed stud projecting from the working tool and arranged to interlock with the key-hole slot of the drill opener, and a fastening member for locking the working tool upon the drill opener.

2. A device of the character described including a handle, a drill opener carried by one end of the handle and arranged at an angle thereto, said drill opener having a longitudinally extending rib pressed therefrom and being provided in the rib with a key-hole slot, a working tool detachably applied to the drill opener and having a longitudinal rib pressed therefrom which engages the longitudinal rib of the drill opener, a headed stud projecting from the working tool and arranged to interlock with the key-hole slot of the drill opener, and a shoulder projecting from the working tool and arranged so that the point of the drill opener will spring into engagement therewith when the headed stud of the tool reaches the contracted end of the key-hole slot.

3. A device of the character described, including a handle, a drill opener carried by one end of the handle and arranged at an angle thereto, said drill opener having a longitudinal rib pressed forwardly therefrom and being provided in the rib with a key-hole slot and an opening, a working tool detachably applied to the drill opener and formed with a longitudinally extending forwardly pressed rib which fits over and receives the rib of the drill opener and has an opening therein adapted to register with the opening of the drill opener, a headed stud projecting from the working tool and arranged to interlock with the key-hole slot of the drill opener, a shoulder projecting from the working tool and so arranged that the end of the drill opener will spring into engagement therewith when the headed stud reaches the contracted end of the key-hole slot, and a locking bolt passing through the registering openings of the drill opener and working tool.

In testimony whereof I have signed my name to this specification in the presence of two subscribing witnesses.

ALLIE B. MUCKLEROY.

Witnesses:
J. R. GRAY,
CHAS. HOYA.

Copies of this patent may be obtained for five cents each, by addressing the "Commissioner of Patents, Washington, D. C."